United States Patent [19]

Sobel et al.

[11] Patent Number: 4,947,397
[45] Date of Patent: Aug. 7, 1990

[54] JOB SCHEDULER DIAGNOSTICS

[75] Inventors: Elliot J. Sobel; Joseph L. Filion, both of Rochester; Douglas F. Sundquist, Victor, all of N.Y.

[73] Assignee: Xerox Corporation, Stamford, Conn.

[21] Appl. No.: 264,772

[22] Filed: Nov. 2, 1988

[51] Int. Cl.[5] ........................ G01R 31/28; G06F 11/00
[52] U.S. Cl. .................................... 371/16.4; 355/205; 371/16.5
[58] Field of Search .................... 371/16.4, 16.5, 29.1; 355/203, 204, 205, 206, 207, 209; 364/200, 900

[56] References Cited

U.S. PATENT DOCUMENTS

| | | | |
|---|---|---|---|
| 4,514,846 | 4/1985 | Federico et al. | 371/16.5 |
| 4,521,847 | 6/1985 | Ziehm et al. | 371/16.4 |
| 4,586,147 | 4/1986 | Tadokoro | 364/550 |
| 4,711,560 | 12/1987 | Hosaka et al. | 355/14 C |
| 4,739,366 | 4/1988 | Braswell et al. | 355/145 H |
| 4,742,483 | 5/1988 | Morrell | 364/900 |
| 4,855,754 | 8/1989 | Tanaka et al. | 355/206 |

Primary Examiner—Charles E. Atkinson
Attorney, Agent, or Firm—Ronald F. Chapuran

[57] ABSTRACT

A reproduction machine having image processing means for forming a image, a controller for directing the operation of the image processing means to complete a job reproduction run, the controller including a random access memory for storing machine status information during a machine cycle down interruption prior to the completion of the job reproduction run, a disk memory, and means for detecting controller faults, the method of saving the status information in the random acess memory including the steps of routinely loading machine status information into the random access memory at a machine cycle down, detecting a pre-determined controller fault causing a machine cycle down, and upon detecting said pre-determined controller fault, automatically transferring the machine status information from the random access memory onto the disk memory.

9 Claims, 7 Drawing Sheets

|  | PREVIOUS CYCLE DOWN | CURRENT CYCLE DOWN | CURRENT SCHEDULE STATE |
|---|---|---|---|
| 1ST CYCLE DOWN | O | A | a |
| 2ND CYCLE DOWN | A | B | b |
| 3RD CYCLE DOWN | B | C | c |

JOB SCHEDULER DIAGNOSTICS

BACKGROUND OF THE INVENTION

The invention relates to a system reproduction machine diagnostics, and more particularly, to a job scheduling and recovery information memory dump for diagnosing such reproduction machines.

As reproduction machines such as copiers and printers become more complex and versatile in the jobs they can do, the interface between the machine and the machine control must necessarily be expanded if full and efficient utilization of the machine is to be realized. A suitable interface must not only provide the controls, displays, and messages necessary to activate, program, monitor, and maintain the machine, but must allow for expanded diagnostics and the means to provide the necessary data to correct control malfunctions or potential malfunctions. The job scheduling and recovery control for modern machines are considerably more complex than in any other previous copier/duplicator products, and must facilitate as many as four copy modes, four input modes, three basic output options, and an inventory of job programming and interactive features such as exception programming, covers, job interrupt, end job, proof set, sample copy and on-the-fly copy quality changes.

The prior art is replete with user interface systems. For example, the Xerox 5700 Electronic Printing System incorporates a touch control CRT screen providing button, key, and window images on the screen combined with text to give concise instructions to the operator. This system accepts magnetic cards, cassettes, and disks that store the documents to be printed and also the magnetic media can store control information to specify the output format for printing or to invoke special features such as merging or interleaving. The system software translates the coded data, formats the page, and generates the hard copy locally, or the system can transmit the data via a communication link to remote 5700 printing sites.

U.S. Pat. No. 4,711,560 discloses a copier which functions according to a sequence control program stored on floppy disk and loaded by a user. The floppy disk can also contain a diagnostic program to facilitate maintenance, and further act as a key to prevent unauthorized use of the copier.

U.S. Pat. No. 4,742,483 discloses a laser printer including a microprocessor to read data or program information from a cartridge loaded by a user. A special maintenance operating system on the cartridge runs the printer through automatic routines to be checked by a technician.

U.S. Pat. No. 4,739,366 to Braswell et al. discloses a diagnostic system for generating information on transport devices. Upon indication of a fault, the data stored in addressable memory is moved to a non-volatile memory. A data display means is also disclosed.

U.S. Pat. No. 4,514,846 to Federico et al. discloses a control system that monitors software crashes to prevent machine malfunctions. A diagnostic path isolates the element containing a fault, records fault histories of each element, and displays such conditions on the control display. Also disclosed is a method for recovering after a software crash.

U.S. Pat. No. 4,586,147 to Tadokoro discloses a history information providing device that uses non-volatile memory for storing failure and usage information, such as total number of pages printed, operating time of motors, number of paper jams, etc. A method of printing out of the history information is also disclosed.

A difficulty with the prior art reproduction machine systems is the inability to provide an on-line diagnostic tool for automatic acquisition of current and past information corresponding to job scheduling and recovery anomalies. This acquired information can be used to debug anomalies at any period of time after they occur. It is an object, therefore, of the present invention to provide a diagnostic procedure which is capable of either automatically or manually transferring vital job scheduler and recovery information to a reserved block of memory on the machine's hard disk in the case of anomaly. The hard disk file can subsequently be transferred to a floppy disk by entering a set of keystrokes on the User Interface Panel while in diagnostics mode and the data on the floppy disk is then available for in depth analysis on a personal computer. Further advantages of the present invention will become apparent as the following description proceeds, and the features characterizing the invention will be pointed out with particularity in the claims annexed to and forming a part of this specification.

SUMMARY OF THE INVENTION

Briefly, the present invention is the method of saving status information in the random access memory in a reproduction machine. In particular, in a reproduction machine having image processing means for forming an image, a controller for directing the operation of the image processing means to complete a job reproduction run, the controller including a random access memory for storing machine status information during a machine cycle down interruption prior to the completion of the job reproduction run, a disk memory, and means for detecting controller faults, the steps of routinely loading machine status information into the random access memory at a machine cycle down, detecting a pre-determined controller fault causing a machine cycle down, and upon detecting said pre-determined controller fault, automatically transferring the machine status information from the random access memory onto the disk memory.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
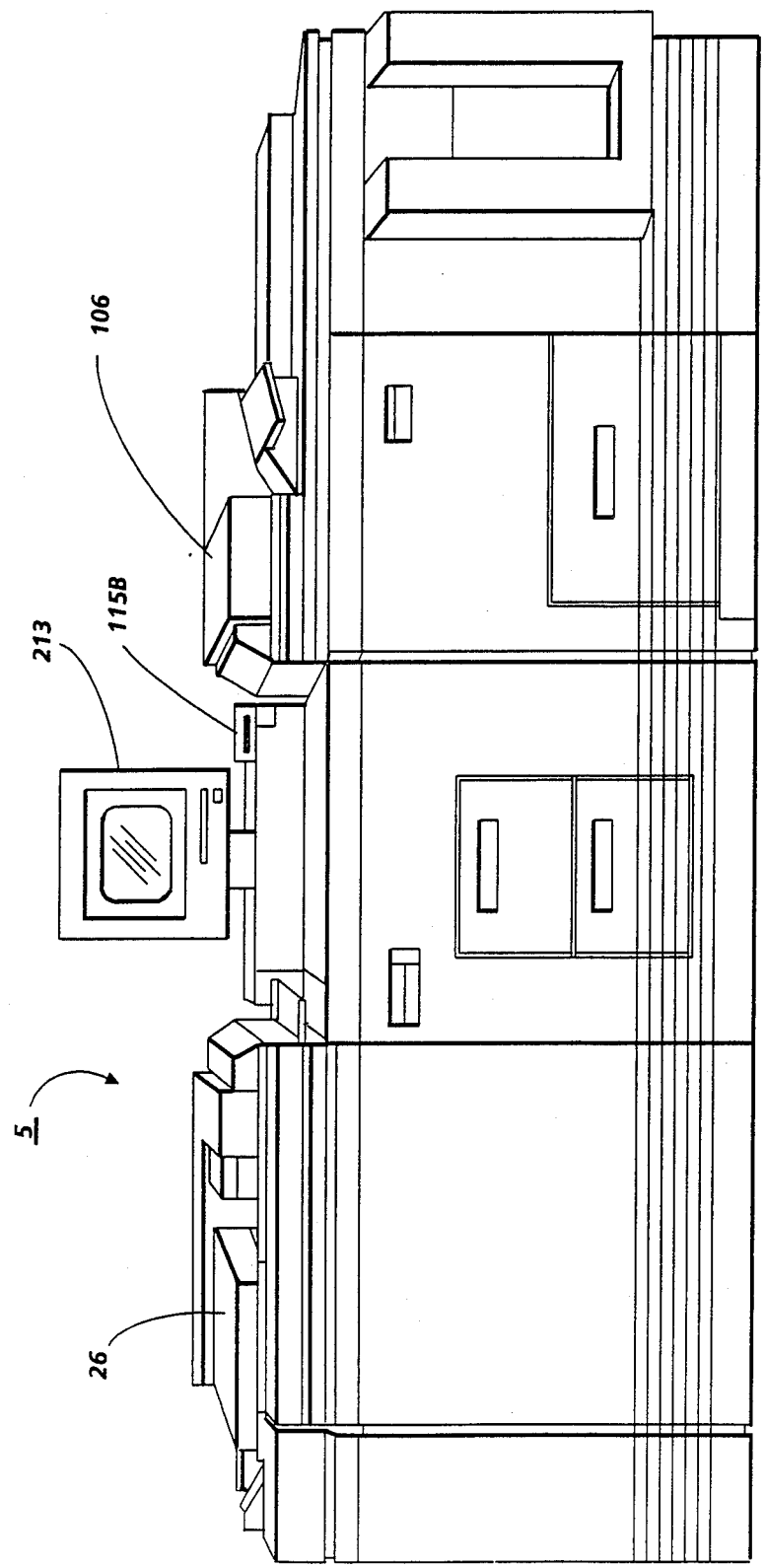
FIG. 1 is an isometric view of an illustrative reproduction machine.
Figure 2:
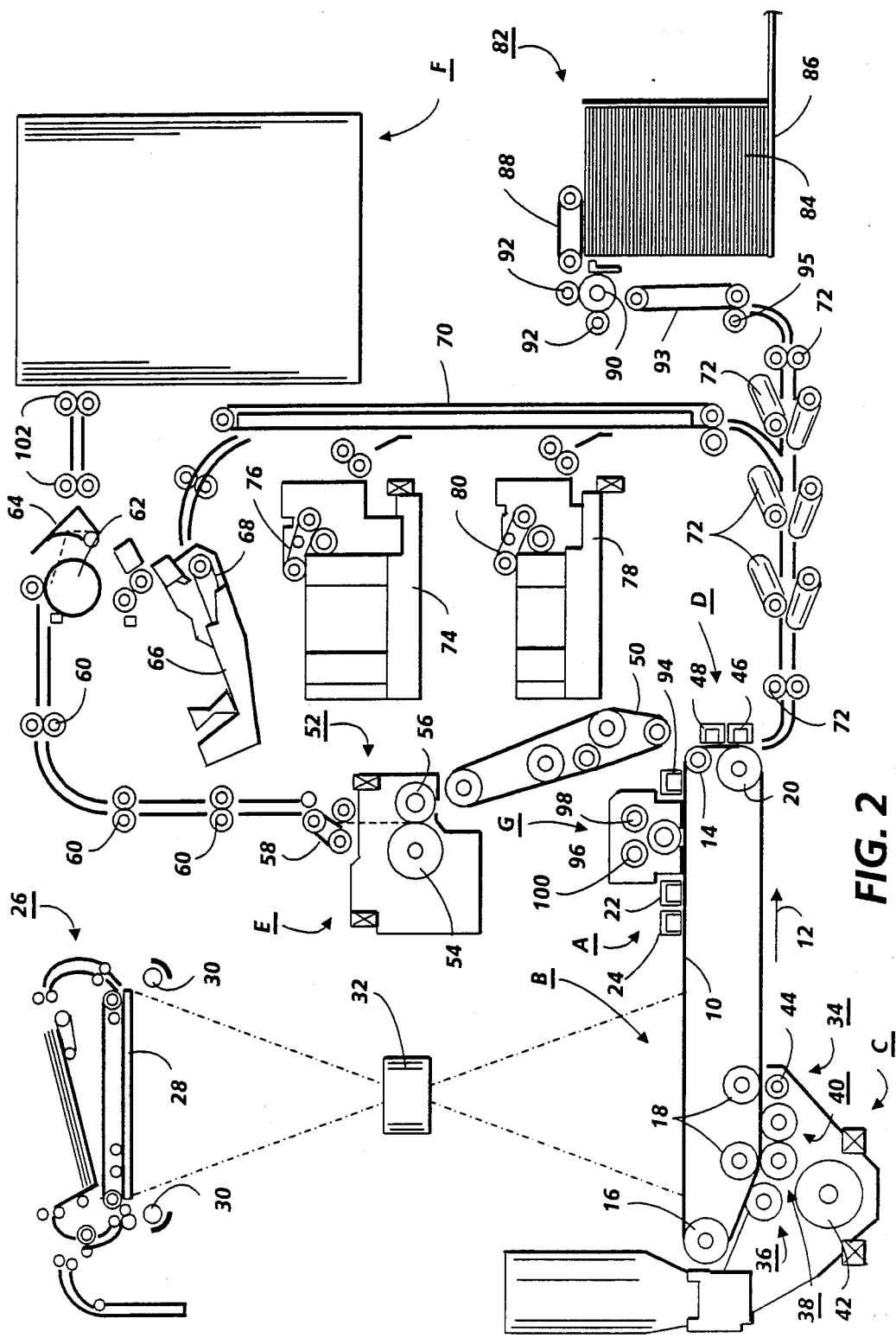
FIG. 2 is a schematic elevational view depicting various operating components and sub-systems of the machine shown in FIG. 1.
Figure 3:
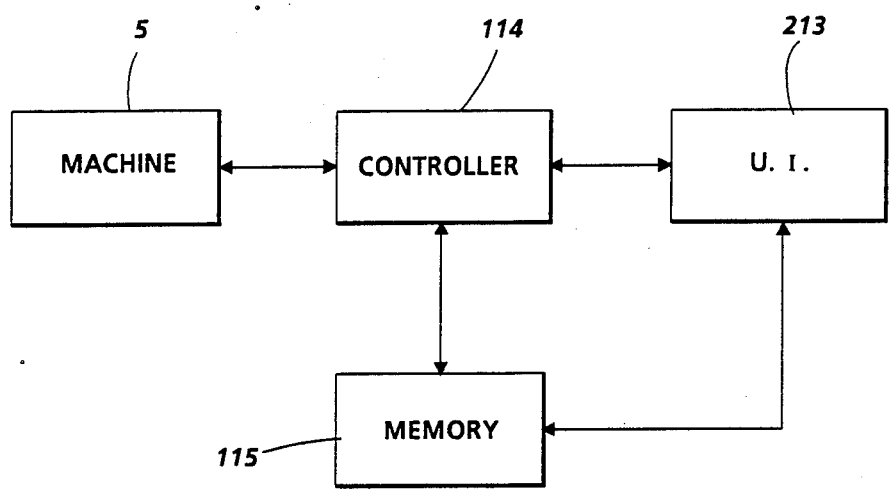
FIG. 3 is a block diagram of the operating control systems and memory for the machine shown in FIG. 1.

For a general understanding of the features of the present invention, reference is made to the drawings. In the drawings, like reference numerals have been used throughout to identify identical elements. Referring to FIGS. 1, 2, and 3, there is shown an electrophotographic reproduction machine 5 composed of a plurality of programmable components and sub-systems which cooperate to carry out the copying or printing job programmed through the touch dialogue User Interface (U.I.) of the present invention. It will become evident from the following discussion that the touch dialogue U.I. of the present invention may be employed in a wide variety of devices and is not specifically limited in its application to the particular embodiment depicted herein.

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76,80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

With reference to FIG. 3, the various functions of machine 5 are regulated by a controller 114 which preferably comprises one or more programmable microprocessors. The controller provides a comparison count of the copy sheets, the number of documents being recirculated, the number of copy sheets selected by the operator, time delays, and jam corrections. Programming and operating control over machine 5 is accomplished through a U.I. 213. Operating and control information is stored in a suitable memory 115 and loaded into controller 114 and job programming instructions are loaded into the controller 114 through U.I. (User Interface) 213. Conventional sheet path sensors or switches may be utilized to keep track of the position of the documents and the copy sheets. In addition, the controller regulates the various positions of the gates depending upon the mode of operation selected.

Figure 4:
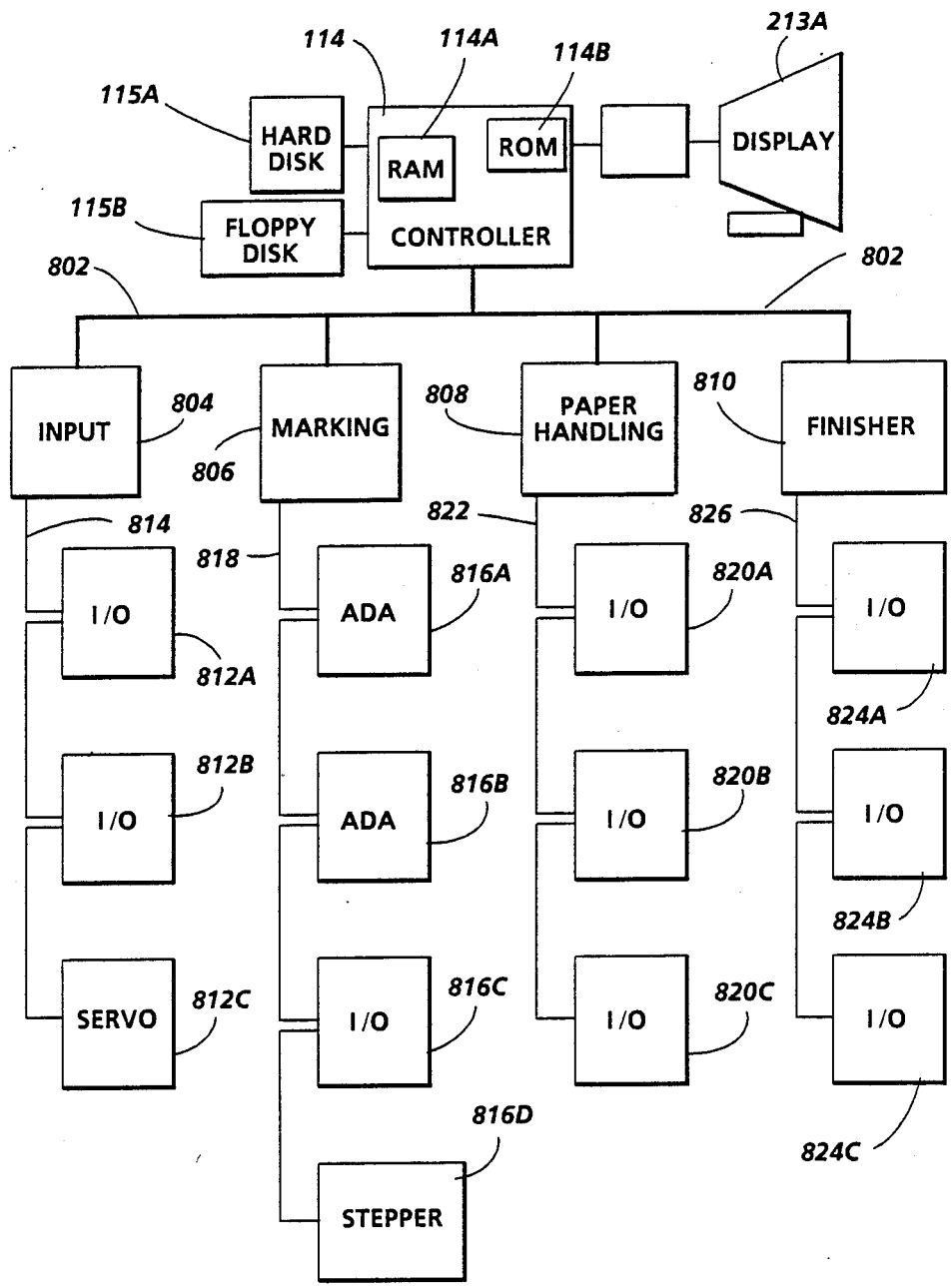
FIG. 4 is a more detailed block diagram of the operating control system of FIG. 3.

With reference to FIG. 4, memory 115 includes a hard or rigid disk drive 115A for receiving suitable rigid memory disks and a floppy disk drive 115B for receiving suitable floppy memory disks, both disk drives being electrically connected to Controller 114, the Controller 114 including RAM 114A and ROM 114B. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. In normal machine operation, all of the control code and screen display information for the machine is loaded from the rigid disk at machine power up. Changing the data that gets loaded into the machine for execution can be done by exchanging the rigid disk in the machine 5 for another rigid disk with a different version of data. In accordance with the present invention, however, all of the control code and screen display information for the machine can be loaded from a floppy-disk at machine power up using the floppy disk drive built into the machine 5. Suitable display 213A of U.I. 213 is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A,B and C to local bus 326.

Figure 5:
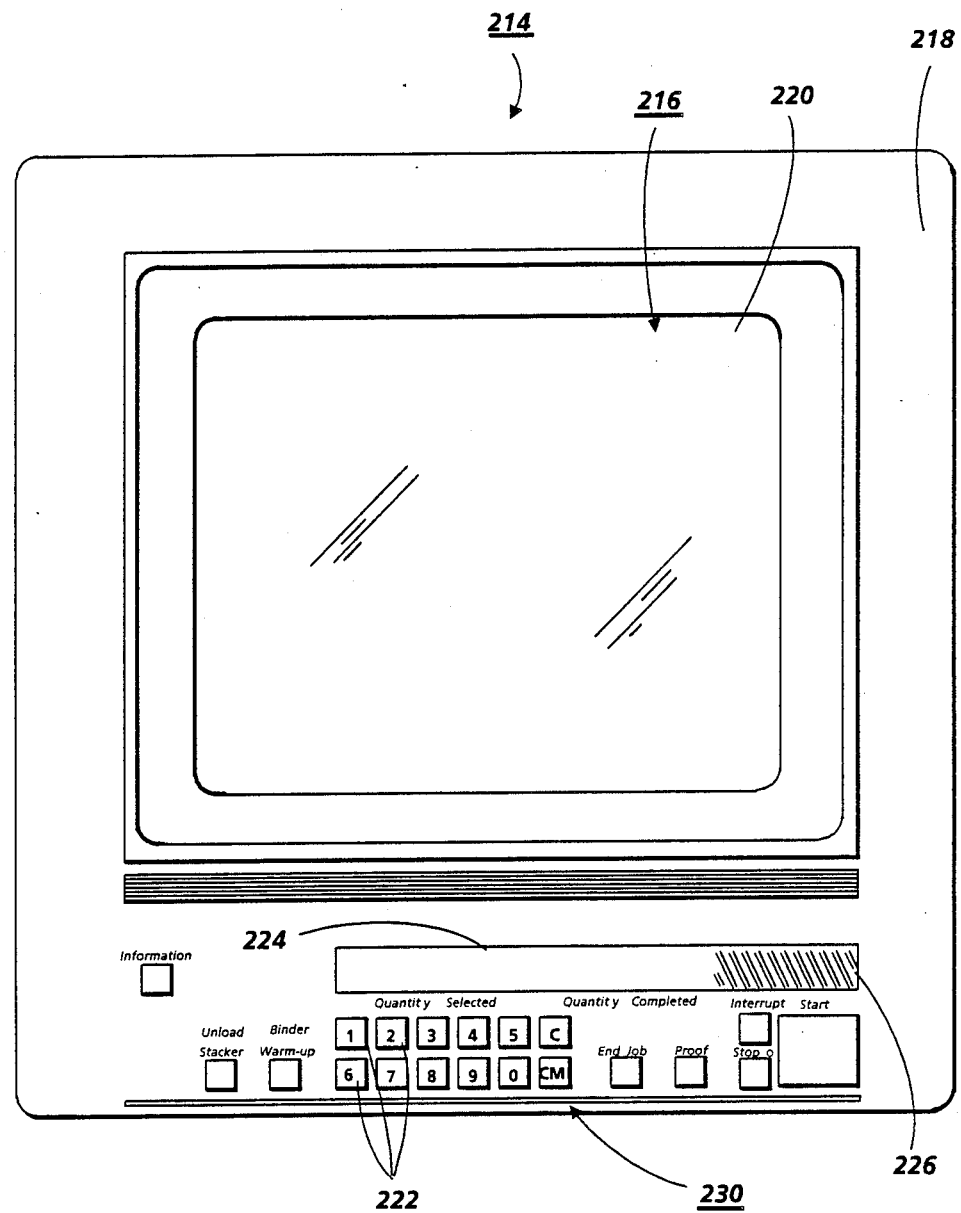
FIG. 5 is a front view of the User Interface touch monitor for the machine shown in FIG. 1.

Referring to FIG. 5, there is shown the color touch monitor 214 for the touch dialogue U.I. 213. Monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0-9" buttons providing a keypad 230 for programming copy quantity, code numbers, etc.; a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up of binder 126; an "Interrupt" button to initiate a job interrupt; a "Proof" button to initiate making of a proof copy; an "End Job" button to end the current job; and an "i" button to initiate a request for information. For further details of the control, reference may be had to U.S. Ser. No. 07/164,365 filed Mar. 4, 1988 and incorporated herein.

In accordance with the present invention, "scheduling" is a broad term that defines the initiation of a sequence of events in the machine that result in the delivery of a copy. The scheduler creates packets of information, called segments, that are transmitted to the base machine describing how the copy is to be made. The scheduler is broken into five functional groupings. The first group, referred to as the steady state scheduler, is responsible for steady scheduling of a job. The second group is recovery, and is responsible for recovering a job that has been interrupted from the steady state, and progressing it to a point at which the steady state scheduler can take over again. The third group is a series of scheduling utility routines, that are used by both scheduling and recovery algorithms in the normal execution of their tasks. Included are things such as capacity checking, exception and cover handling, skip pitch routines, job interrupt code, etc. The fourth group is called send segment, and it has responsibility for last minute massaging of the segment; building dual segments, scheduling copy quality changes and required skip pitches, inserting sample copies, and so on. The last group is the recovery state handler, for monitoring the progression of a job from signals provided by the base machine, and puts them in a usable form for recovery in the event of a shutdown.

Typical scheduling errors occur during or after recovery when the steady state scheduling routines have been interrupted. If a job runs correctly once it will always run correctly and testing the steady state is a relatively simple matter. Recovery, on the other hand, can occur at any time during a job and in an almost infinite number of combinations. Since recovery is very difficult to test it is the most likely cause of scheduling errors. For this reason, it is important to know the state of the machine prior to the scheduling error so that the flow can be followed.

Each; time the machine shuts down, a routine, ShowSnapshot is called. ShowSnapshot, if enabled in NVM, dumps recovery variables to a workstation display. These variables include such things as delivery information, scheduler phases, and purges. That is, when in a debug mode, ShowSnapshot is enabled through NVM, and the state of the machine is printed out on a workstation display. Debugging then consists of receiving the data from the previous cycledown and the current cycledown to determine what went wrong.

In accordance with the present invention, this data dump is done for every cycledown in memory by a routine called DumpRecoveryVars. At the occurrence of a scheduler detected error, this data is available to be automatically transferred to the hard disk.

The scheduler can detect certain mistakes that it has made. Just prior to queueing, the scheduler calls a routine, SchedMonitor, that checks each segment and insures that everything is in order. If a problem is found, a fault is declared and the segment is not queued. Such errors typically occur out of recovery and include for example:

1. original number=0 (that is, an original is identified as zero)
2. events=0 (that is, the machine is requested to do something zero times)
3. flash mode >9999, indicating <0 (that is, the selected number of flashes is greater than 9999)

4. starting quantity>9999, indicating<0 (that is, the selected number of copies is greater than 9999)
5. source tray info=0 (that is, the paper handling board or mode is given no sheet source information).

In accordance with the present invention, a system has been implemented called SchedBug that maintains a recovery history and triggers automatically at the occurrence of one of the scheduler faults. It takes all of the history information plus the current state of the machine and the scheduler, along with the fault that caused it, and transfers it to the hard disk. This information can be extracted at a later time onto a floppy and then analyzed on a separate personal computer. The SchedBug description is broken down into four phases: (1) maintaining the history of previous shutdowns, (2) the fault triggering and what happens then, (3) retrieval of the data to a floppy, and (4) analysis of the data on a personal computer.

(1) Maintaining the History of the Previous Shutdown

Every time the machine shuts down, the data that was dumped by DumpRecoveryVars (as described) at the last shutdown is transferred to a portion of a larger 255 byte buffer. This is actually done by DumpRecoveryVars before it dumps the current shutdown. This buffer is broken into three sections; a previous shutdown section which contains the state of the machine at the previous shutdown, a current shutdown section which contains the state of the machine at the current shutdown, and a current segment section which contains the current state of the scheduler. Each time a shutdown occurs the first portion is overwritten with the new "previous shutdown". The routine that does this is XferRecryDumptoBuffer, and it is passed a parameter, which is actually an offset from the beginning of the buffer at which to begin storing the data.

(2) Fault Triggering

At the time a scheduler fault occurs, or a fault is declared by the base machine that is known to be caused by scheduling errors, the fault handler sets a flag that causes a routine to execute, SchedDebugger, which will eventually transfer all of the data to the hard or rigid disk.

When the SchedDebugger is initiated, DumpRecoveryVars is called. This routine transfers the previous shutdown block as described above and dumps the current shutdown block, then returns. XferRecryDumpToBuffer is now called with an offset that indicates to store the data from DumpRecoveryVars in the location starting at the "current shutdown" section of the buffer. XferCurrent SegmentToBuffer is called which transfers several of the current scheduler variables to their corresponding section in the buffer. The whole block is now transferred to a fixed location on the hard disk. A pattern byte is also set up and stored with the data. This is used by the retrieve-to-floppy routines to validate the data on the disk.

(3) Retrieval of the Data to a Floppy

Retrieving the data to a floppy is initiated through a series of key punches on the console. When completed, SchedDebugger will be started. SchedDebugger has two options for retrieving data; one, ReadFromDisk, which is used to retrieve data directly from the hard disk, and one, ManualTransfer, that is used to retrieve data for scheduling errors that don't necessarily have a fault associated with them. In the case of manual transfer, the transfer of the current shutdown and the current segment, and then the transfer of the buffer to the hard disk have not occurred automatically, so they have to be completed before retrieving to the floppy.

The pattern byte is validated first. The routine then assigns a file name for the file on the floppy. The access of the hard disk and the floppy disk has to be done in no smaller than 255 byte blocks. The block that is used to buffer the data to the hard disk is the same block used to buffer the data to the floppy.

(4) Analysis of the Data on a PC

Once the data is on a floppy it can be read on a PC. A routine SchedBug c, allows scrolling through the data page by page on the screen or allows a dump to a file to be printed out. It breaks the data down into three sections just as it was done on the machine.

Figure 6:
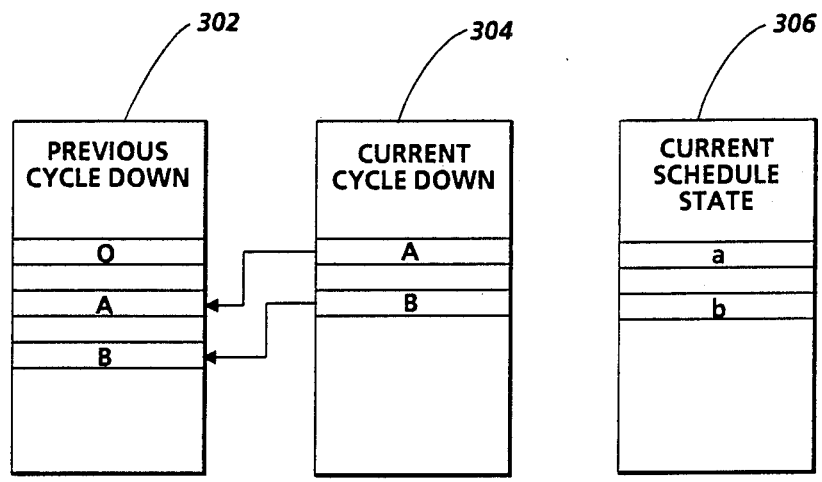
FIG. 6 is an illustration of the scheduler memory dump to disk in accordance with the present invention.

With reference to FIG. 6, there is illustrated a scheduler data dump in accordance with the present invention. Three segments of RAM 114A are shown, in particular, Previous Cycle Down 302, Current Cycle Down 304, and Current Scheduler State 306. Initially, segments 302 and 304 contain no data. At the first cycle down of the machine at the end of a job reproduction run or upon the detection of a malfunction, data representing the successful delivery of sheets in the machine is stored in segment 304.

For example, segment 304 will contain information identifying the last copy sheet delivered to the duplex tray, the last sheet delivered to the finisher, and the last document that was flashed. This data is represented by the block labeled "A" in Segment 304. Also, data identifying the status of the scheduler at the time of the cycle down is stored in Current Scheduler State 306. For example, Current Scheduler State 306 will contain such information as the identification of the original currently being worked on by the scheduler, and the projected destination of the copy sheet, and constant data such as the total number of documents, whether or not an RDH pre-count was needed and the identification of the finisher mode. At the first cycle down, no data is stored in Previous Cycle Down 302 as shown by the "zero". The information in Current Cycle Down 304 is illustrated by "A" and the information in Current Scheduler State 306 is illustrated by "a".

At the second cycle down, the information "A" in Current Cycle Down 304 is transferred to Previous Cycle Down 302 as illustrated by the arrow, and the second cycle down data shown as "B" is stored in Current Cycle Down 304. The current job state data "a" is replaced by data "b" in Current Scheduler State 306. This sequence is repeated in order to have updated cycle down data and current scheduler state available for an automatic dump to the hard disk in drive 115A.

In accordance with the another aspect of the present invention, there is an automatic dump of the three RAM segments 302, 304, 306 to the hard disk upon the detection of predetermined control anomalies. Such predetermined irregularities include such things as scheduler requests to make copies of an original that does not exist or that is not identified in the scheduler procedure, requests by the scheduler to make zero copies, and the mis-numbering or mis-identification of pages. Upon the recognition of a predetermined anamoly such as described, there is an automatic dump of the contents of the segments 302, 304, and 306 to the rigid disk. The data on the rigid disk is then available for analysis according to one of a number of available options. For example, the data of the segments 302, 304, and 306 on hard disk can be transferred to a floppy disk and then to a personal computer or the data can be sent directly to a printer or communication channel through a suitable communications port. This procedure is illustrated in the data flow chart in FIG. 7.

Figure 7:
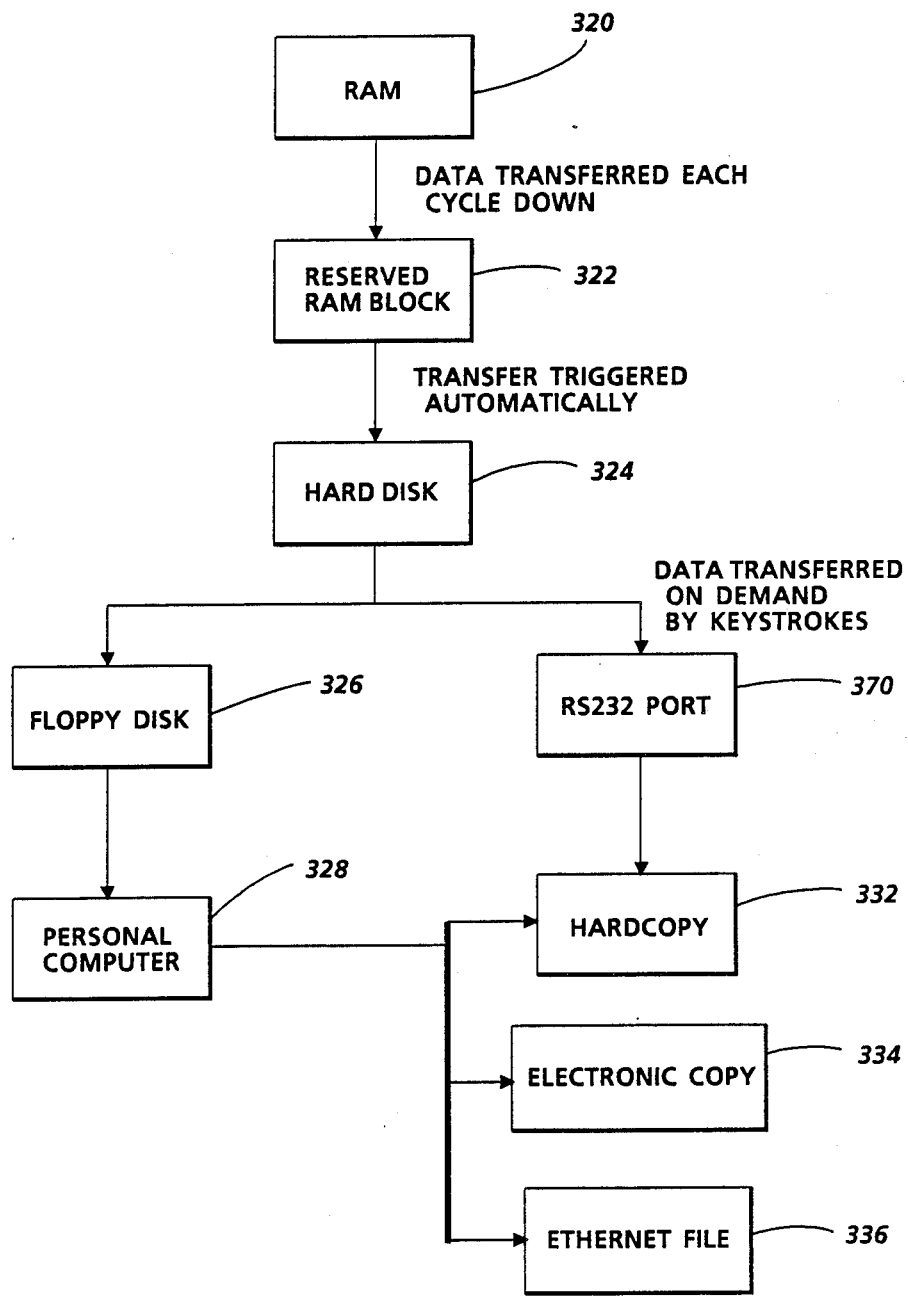
FIG. 7 is an illustration of RAM dump options in accordance with the present invention.

With reference to FIG. 7, machine control data contained in RAM illustrated at 320 is transferred to a reserved RAM block illustrated 322 at each machine cycle down. These are the segments 302, 304, and 306, as illustrated in FIG. 6. Upon the detection of a predetermined anamoly in the control scheduler, the data in the reserved RAM block is automatically transferred to hard disk as shown at 324. It should be noted that a manual transfer of data is also possible.

An attempt has been made in accordance with the present invention to prevent job scheduling and recovery anomalies from affecting the rest of the system by using software faults to preempt the distribution of erroneous information. These software faults are declared in the same way as any other fault in the system, with the exception that they automatically trigger the scheduler diagnostics. As described above, the block of memory representing current and past states of the scheduler software is transferred to a file on the hard disk and assigned of file name. The file is appended with relevant job programming information such as copy mode, input and output mode, and the exact code of the fault which initiated the diagnostic process.

On the other hand, certain manifestations of job scheduling and recovery anomalies do not result in software system faults, but must be recorded for investigation nonetheless. The manual trigger of the scheduler diagnostic program provides a mechanism for such an investigation. Observant technical representative, technicians or machine operators who identify errant scenarios can transfer the past and present states of the scheduler software to a hard disk file on demand. A set of hard panel keystrokes and a diagnostics entry password is required to initiate the procedure.

After the data file is captured on floppy disk, it must be analyzed on a personal computer. The data analysis program reads the file from the floppy disk and formats the information for hard copy or electronic observation. Software is also available to transfer the file from the personal computer to an ethernet fileserver. The anomaly information can then be retrieved by ethernet compatible workstations. For example, with reference to FIG. 7, the data can be transferred to a floppy disk illustrated at 326 and then loaded into the floppy disk drive of a personal computer for display. The data can then be transferred to a hard copy printer shown at 332, stored as an electronic file illustrated at 334 or conveyed to a communications channel such as an ethernet file shown at 336. The data can also be transferred on demand by operator console keystrokes through a communication port, illustrated at 330, and delivered to the hard copy printer illustrated at 332.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In an image processing apparatus having image processing means for forming an image, a controller for directing the operation of the image processing means, the controller including a random access memory, a second memory, and means for detecting controller faults, a portion of the random access memory allocated to store controller status information, said portion of the random access memory including previous apparatus cycle down state information and current job imaging process completion information, the method of saving information for diagnosing the controller comprising the steps of:
   periodically loading controller status information into said portion of the first memory,
   detecting a pre-determined controller fault, and
   automatically transferring the control status information from said portion of the random access memory into the second memory in response to the detection of said predetermined controller fault.

2. The method of claim 1 wherein the second memory is a rigid disk memory.

3. The method of claim 2 including the step of transferring the information on the rigid disk onto a floppy disk.

4. The method of claim 1 including the step of printing the information on the rigid disk onto hard copy.

5. In a reproduction machine having image processing means for forming an image, a controller for directing the operation of the image processing means to complete a job reproduction run, the controller including a random access memory for storing machine status information during a machine cycle down interruption prior to the completion of the job reproduction run, a disk memory, and means for detecting controller faults, the random access memory including a first segment storing the status information of the current machine cycle down and a second segment storing the status information of a previous machine cycle down, the method of saving the status information in the random access memory comprising the steps of:
   routinely loading machine status information into the random access memory at a machine cycle down,
   detecting a pre-determined controller fault causing a machine cycle down, and
   upon detecting said pre-determined controller fault, automatically transferring the machine status information from the random access memory onto the disk memory.

6. The method of claim 5 wherein the random access memory includes a third segment storing the current status of the in process job reproduction run.

7. In a reproduction machine having image processing means for forming an image, a controller for directing the operation of the image processing means to complete a job reproduction run, the controller including a disk memory, means for detecting controller faults, and a random access memory for storing machine status information during a machine cycle down interruption prior to the completion of the job reproduction run, the random access memory including a first segment storing the status information of the current machine cycle down, a second segment storing the status information of a previous machine cycle down, and a third segment storing the current status of the in-process job reproduction run, the method of saving the status information in the random access memory comprising the steps of:

loading machine status information into the first segment of the random access memory at a first machine cycle down, loading current status information of the in-process job reproduction run into the third segment of the random access memory, transferring the machine status information from the first segment of the random access memory to the second segment of the random access memory at a second machine cycle down, loading machine status information into the first segment of the random access memory at the second machine cycle down, replacing the current status information of the in-process job reproduction run into the third segment of the random access memory, detecting a pre-determined controller fault causing a machine cycle down, and, upon detecting said pre-determined controller fault, automatically transferring the machine status information corresponding to both the first and the second machine cycle down from the random access memory onto the disk memory.

8. The method of claim 7 including the step of printing the transferred machine status information on the disk memory onto hard copy.

9. The method of claim 7 including the step of transferring the transferred machine status information on the disk memory to a personal computer or to a communications network.

* * * * *